United States Patent
Suzuki et al.

(10) Patent No.: US 11,163,918 B2
(45) Date of Patent: Nov. 2, 2021

(54) ASSISTANCE SYSTEM, DESIGN ASSISTANCE APPARATUS, AND NON-TRANSITORY COMPUTER READABLE MEDIUM STORING DESIGN ASSISTANCE PROGRAM

(71) Applicant: FUJIFILM BUSINESS INNOVATION CORP., Tokyo (JP)

(72) Inventors: Takahiro Suzuki, Kanagawa (JP); Shinji Kawabata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 225 days.

(21) Appl. No.: 16/137,225

(22) Filed: Sep. 20, 2018

(65) Prior Publication Data
US 2019/0087512 A1 Mar. 21, 2019

(30) Foreign Application Priority Data
Sep. 20, 2017 (JP) .............................. JP2017-180299

(51) Int. Cl.
*G06F 30/00* (2020.01)
*G06F 111/02* (2020.01)
*G06F 111/20* (2020.01)

(52) U.S. Cl.
CPC .......... *G06F 30/00* (2020.01); *G06F 2111/02* (2020.01); *G06F 2111/20* (2020.01)

(58) Field of Classification Search
CPC ... G06F 30/00; G06F 2111/02; G06F 2111/20
(Continued)

(56) References Cited

U.S. PATENT DOCUMENTS 6,074,443 A * 6/2000 Venkatesh ......... H01L 21/67167
    29/25.01
7,958,295 B1 * 6/2011 Liao .................... G06F 13/4045
    710/244
(Continued)

FOREIGN PATENT DOCUMENTS

| JP | 2008-262540 A | | 10/2008 |
|---|---|---|---|
| JP | 2012118939 A | * | 6/2012 |
| JP | 2013-097743 A | | 5/2013 |

OTHER PUBLICATIONS

English translation of JP2012118939A, Google Patents, 12 pages. (Year: 2012).*
(Continued)

*Primary Examiner* — Brian S Cook
(74) *Attorney, Agent, or Firm* — Oliff PLC

(57) ABSTRACT

A design assistance system includes a component information management server and a design terminal. The component information management server includes an issue/measure information memory and a priority index memory. The issue/measure information memory stores a component to be used in a design assistance tool, an issue on the component, and measures to address the issue in association with each other. Each measure is at least one of addition of an addition target component and removal of a removal target component. The priority index memory stores a priority index in association with the addition target component and the removal target component. The design terminal includes a measure display that displays measures to address an issue on a focused component in a format based on the priority index associated with at least one of the addition target component and the removal target component included in each measure.

9 Claims, 9 Drawing Sheets

(58) Field of Classification Search
USPC .............................................................. 703/1
See application file for complete search history.

(56) References Cited

U.S. PATENT DOCUMENTS

| | | | | |
|---|---|---|---|---|
| 8,065,289 B2* | 11/2011 | Furumoto | ........... | G06F 16/2458 |
| | | | | 707/706 |
| 2010/0174449 A1* | 7/2010 | Kim | ..................... | G07C 5/0866 |
| | | | | 701/33.4 |
| 2010/0249975 A1* | 9/2010 | Rezayat | ................. | G06Q 10/06 |
| | | | | 700/106 |
| 2017/0351244 A1* | 12/2017 | Wolf | .................. | G05B 19/4063 |

OTHER PUBLICATIONS

Scheme-based work assignment in a workflow system, IBM technical Disclosure Bulletin, Oct. 2000 UK (Year: 2000).*

* cited by examiner

FIG. 3A

| ISSUE ID | COMPONENT NUMBER | DETAILS OF ISSUE | MEASURE ID | DATE OF CREATION |
|---|---|---|---|---|
| I01 | AB012C | CARE SHOULD BE TAKEN FOR DETERIORATION OF PERIPHERY DUE TO HEAT | S01<br>S02<br>S03<br>S04 | 3/1/2017 |
| ... | ... | ... | ... | ... |

FIG. 3B

| MEASURE ID | DETAILS OF MEASURE | REMOVAL TARGET COMPONENT NUMBER | ADDITION TARGET COMPONENT NUMBER | APPLIED PRODUCT | LINK TO DETAILS | URGENCY LEVEL | DATE OF CREATION |
|---|---|---|---|---|---|---|---|
| S01 | ADD COOLING FAN | | ZZ888A | PRODUCT A | LINK 01 | A | 3/2/2017 |
| S02 | CHANGE TO SUCCEEDING COMPONENT | AB012C | AB012D | PRODUCT B<br>PRODUCT C | LINK 02<br>LINK 03 | C | 3/10/2017 |
| S03 | REPLACE WITH COMBINATION OF DIFFERENT COMPONENTS | AB012C | CD333A<br>EF543B<br>GH555A | PRODUCT D | LINK 04 | B | 4/1/2017 |
| S04 | REPLACE WITH DIFFERENT COMPONENT TOGETHER WITH ADJACENT COMPONENT | AB012C<br>IJ345A | KL666A | PRODUCT E | LINK 05 | C | 4/10/2017 |
| ... | ... | ... | ... | ... | ... | ... | ... |

| COMPONENT NUMBER | PRICE (USD) | NUMBER OF SHIPPED MAINTENANCE COMPONENTS | CUMULATIVE TOTAL OF SHIPMENTS | MAINTENANCE FACTOR (%) |
|---|---|---|---|---|
| AB012C | 10 | 256 | 31235 | 0.82 |
| AB012D | 9 | 156 | 1250 | 12.48 |
| ZZ888A | 3 | 56 | 2345678 | 0.0024 |
| IJ345A | 5 | 35 | 35601 | 0.1 |
| CD333A | 2 | 23 | 65984 | 0.035 |
| EF543B | 3 | 35 | 2335 | 1.5 |
| GH555A | 2 | 356 | 23659 | 1.5 |
| KL666A | 8 | 650 | 5678 | 11.45 |
| ... | ... | ... | ... | ... |

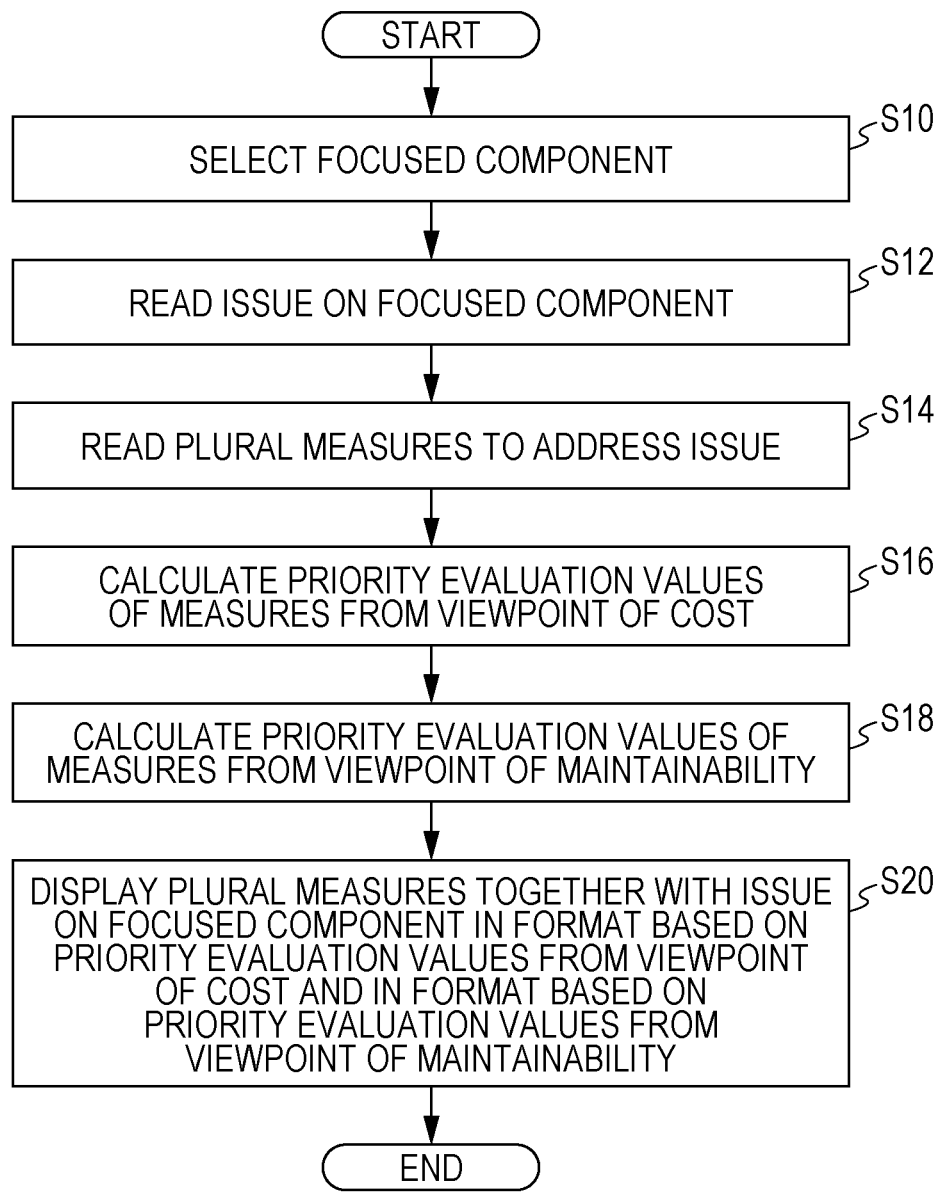

ASSISTANCE SYSTEM, DESIGN ASSISTANCE APPARATUS, AND NON-TRANSITORY COMPUTER READABLE MEDIUM STORING DESIGN ASSISTANCE PROGRAM

CROSS-REFERENCE TO RELATED APPLICATIONS

This application is based on and claims priority under 35 USC 119 from Japanese Patent Application No. 2017-180299 filed Sep. 20, 2017.

BACKGROUND

(i) Technical Field

The present invention relates to a design assistance system, a design assistance apparatus, and a non-transitory computer readable medium storing a design assistance program.

(ii) Related Art

There is known a design assistance tool that assists designing work conducted by a design engineer. Examples of the design assistance tool include a 2D or 3D computer-aided design (CAD) and a software development environment.

Regarding the design assistance tool, there is proposed a technology for sharing problems (issues) found during designing among plural design engineers.

SUMMARY

According to an aspect of the invention, there is provided a design assistance system including a component information management server and a design terminal. The component information management server includes an issue/measure information memory and a priority index memory. The issue/measure information memory stores a component to be used in a design assistance tool, an issue on the component, and plural measures to address the issue in association with each other. Each of the plural measures is at least one of addition of an addition target component and removal of a removal target component. The priority index memory stores a priority index in association with the addition target component and the removal target component. The design terminal includes a measure display that displays, while designing is conducted by using the design assistance tool, plural measures to address an issue on a focused component in a format based on the priority index associated with at least one of the addition target component and the removal target component included in each of the measures.

BRIEF DESCRIPTION OF THE DRAWINGS

An exemplary embodiment of the present invention will be described in detail based on the following figures, wherein:

FIGS. 3A and 3B are conceptual diagrams illustrating examples of an issue table and a measure table included in an issue/measure DB;

FIG. 4 is a conceptual diagram illustrating an example of a priority index DB;

FIG. 9 is a flowchart illustrating a flow of processing performed in the design assistance system according to the exemplary embodiment.

DETAILED DESCRIPTION

An exemplary embodiment of the present invention is described below.

Figure 1:
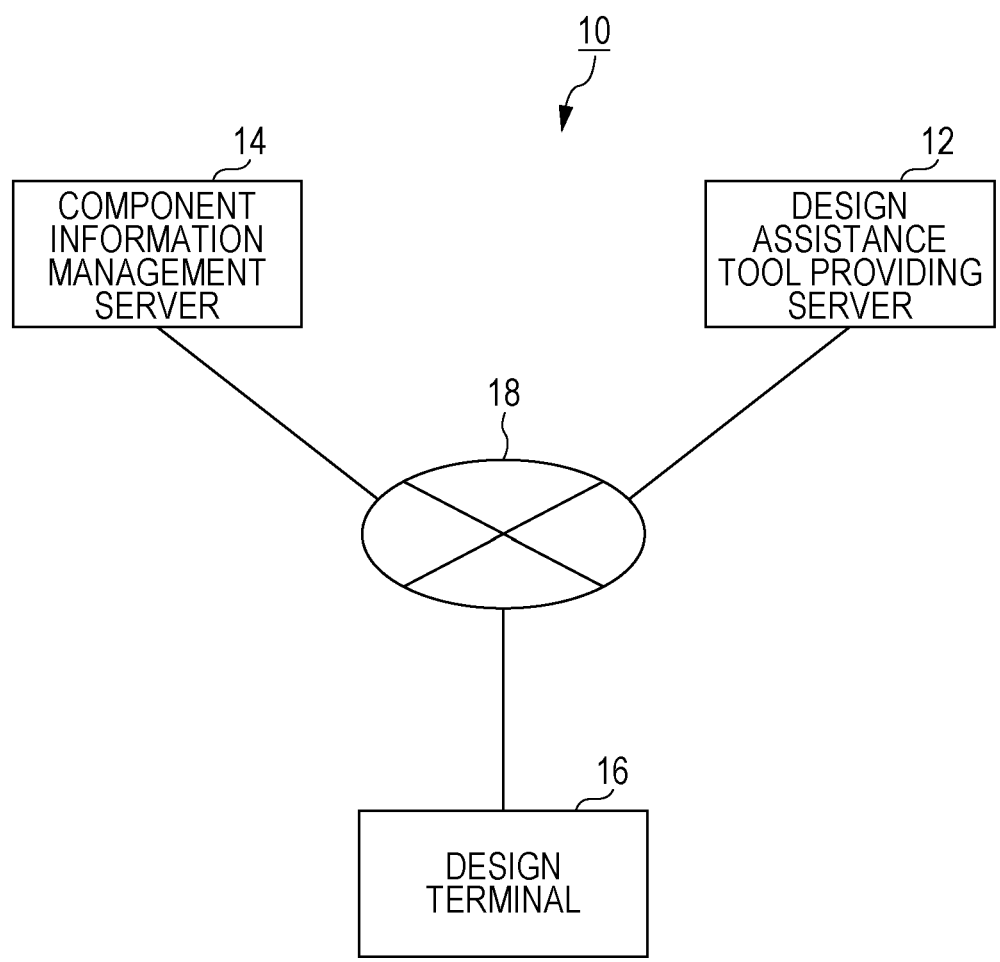
FIG. 1 is a schematic diagram illustrating the configuration of a design assistance system according to an exemplary embodiment.

FIG. 1 is a schematic diagram illustrating the configuration of a design assistance system 10 according to this exemplary embodiment. The design assistance system 10 is a system that provides a design assistance tool for a design engineer. The design assistance system 10 includes a design assistance tool providing server 12, a component information management server 14, and a design terminal 16 that is a terminal to be used by the design engineer. The design assistance tool providing server 12, the component information management server 14, and the design terminal 16 are communicably connected to each other via a communication network 18 such as the Internet or a local area network (LAN). FIG. 1 illustrates one design terminal 16 alone but the design assistance system 10 includes plural design terminals 16 to be used by plural design engineers.

The design assistance tool providing server 12 is a server that provides a design assistance tool for the design terminal 16 (design engineer). In this exemplary embodiment, the design assistance tool providing server 12 provides a 3D CAD for the design engineer as the design assistance tool. That is, in this exemplary embodiment, the design assistance tool providing server 12 is a cloud server that provides a cloud 3D CAD. Specifically, the design engineer who operates the design terminal 16 may use the 3D CAD provided by the design assistance tool providing server 12 (hereinafter referred to simply as "3D CAD") by accessing the design assistance tool providing server 12 with an Internet browser that operates on the design terminal 16. The design assistance tool provided by the design assistance tool providing server 12 is not limited to the 3D CAD but may be a 2D CAD or a software development environment.

The hardware configuration of the design assistance tool providing server 12 may be equivalent to those of general server computers. That is, the design assistance tool providing server 12 includes a controller configured by a central processing unit (CPU) or the like, a storage unit configured by a hard disk drive, a read only memory (ROM), a random access memory (RAM), or the like, and a communication unit configured by a network adapter or the like.

Figure 2:
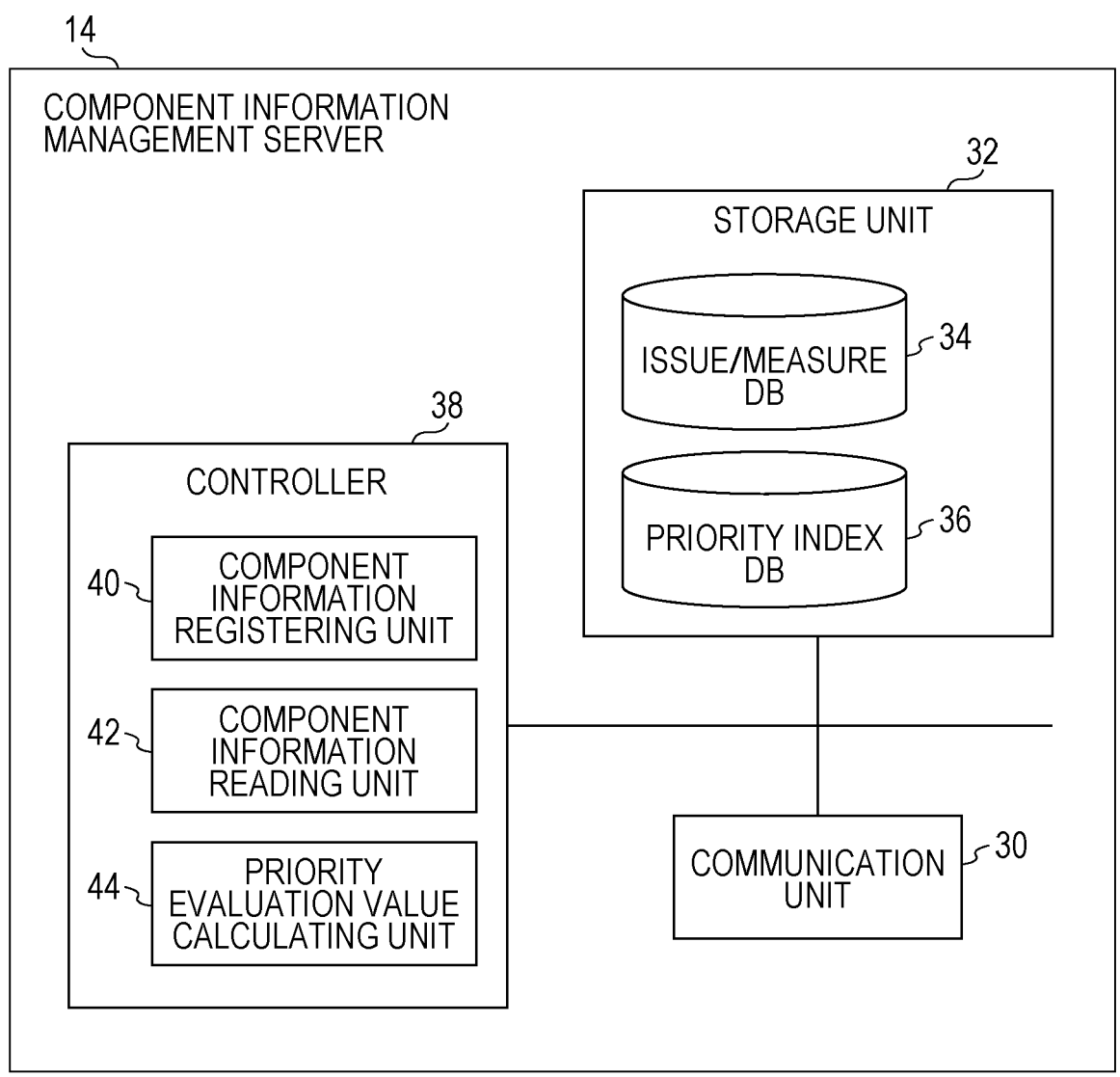
FIG. 2 is a schematic diagram illustrating the configuration of a component information management server according to the exemplary embodiment.

FIG. 2 is a schematic diagram illustrating the configuration of the component information management server 14. The component information management server 14 is a server that manages component information relating to components to be used in the 3D CAD. As described later in detail, the component information relating to components includes issues on the components and measures to address the issues.

A communication unit 30 is configured by, for example, a network adapter. The communication unit 30 exerts a function of communicating with the design assistance tool providing server 12 and the design terminal 16 via the communication network 18.

A storage unit 32 is configured by, for example, a hard disk drive, a ROM, or a RAM. The storage unit 32 stores a program for operating respective units of the component information management server 14. As illustrated in FIG. 2, the storage unit 32 stores an issue/measure DB 34.

The issue/measure DB 34 cumulatively stores components to be used in the 3D CAD, issues on the components, and measures to address the issues in association with each other. Thus, the storage unit 32 also functions as an issue/measure information memory. FIGS. 3A and 3B illustrate examples of details of the issue/measure DB 34. The issue/measure DB 34 of this exemplary embodiment includes an issue table and a measure table. FIG. 3A illustrates an example of details of the issue table. FIG. 3B illustrates an example of details of the measure table.

As illustrated in FIG. 3A, the issue table stores issue IDs, component numbers, details of issues, measure IDs, and dates of creation in association with each other.

The issue ID is a number (or a symbol; the same applies to other numbers) for uniquely identifying a record in the issue table (that is, an issue on a component). The issue ID is assigned by a component information registering unit 40 described later when a new record is added to the issue table.

The component number is a number for uniquely identifying a component of the 3D CAD that is registered (stored) in the issue/measure DB 34.

The details of an issue are details of an issue on the component indicated by the component number. The issue on the component includes a problem caused by the component on a different component of a product or a problem caused in the component itself (such as damage or deformation). The issue on the component is also a problem caused by the component on a product that uses the component. For example, details of an issue indicated by an issue ID "I01" show that a component indicated by a component number "AB012C" (the component indicated by the component number is hereinafter referred to simply as a component "AB012C" or the like) generates heat and therefore an issue is registered to show that care should be taken for deterioration of the periphery (structure) due to the heat of the component.

The measure ID is a number for uniquely identifying a measure to address the issue. Details of the measure indicated by each measure ID are registered in the measure table described later.

The date of creation is a date when the record is registered.

Although details are described later, among the pieces of information registered in the issue table, the component number, the details of the issue, and the measure ID are registered based on an input from the design engineer who is involved in designing by using the 3D CAD.

As illustrated in FIG. 3B, the measure table stores the measure IDs, details of measures, removal target component numbers, addition target component numbers, applied products, links to details, urgency levels, and dates of creation in association with each other.

As described above, the measure ID is a number for uniquely identifying a measure to address the issue registered in the issue table. The measure ID is assigned by the component information registering unit 40 when a new record is added to the measure table.

The details of a measure are details of the measure to address the issue associated with the measure ID in the issue table. The details of the measure include at least one of addition of an addition target component and removal of a removal target component. For example, details of a measure indicated by a measure ID "S01" show "ADD COOLING FAN" and details of a measure indicated by a measure ID "S02" show "CHANGE TO SUCCEEDING COMPONENT". The "change" refers to such a measure that the component is removed and then a different component is added.

The removal target component number is a component number of a component to be removed by taking the measure shown in the details of the measure. For example, the details of the measure indicated by the measure ID "S01" show "ADD COOLING FAN". Therefore, there is no component to be removed. Thus, the removal target component number of the record is left blank. The details of the measure indicated by the measure ID "S02" show "CHANGE TO SUCCEEDING COMPONENT". Therefore, the component "AB012C" that is a component associated with the measure ID "S02" in the issue table is registered as the component to be removed.

The addition target component number is a component number of a component to be added by taking the measure shown in the details of the measure. For example, the details of the measure indicated by the measure ID "S01" show "ADD COOLING FAN". Therefore, a component number "ZZ888A" of the cooling fan is registered as the component number of the component to be added. The details of the measure indicated by the measure ID "S02" show "CHANGE TO SUCCEEDING COMPONENT". Therefore, a component "AB012D" succeeding to the component associated with the measure ID "S02" in the issue table is registered as the component to be added.

The applied product is a number for uniquely identifying a product to which the measure is applied. For example, the measure indicated by the measure ID "S01" is applied to a product A and the measure indicated by the measure ID "S02" is applied to a product B. The measure IDs "S01" and "S02" are associated with the same issue (issue ID: "I01", details of issue: "CARE SHOULD BE TAKEN FOR DETERIORATION OF PERIPHERY DUE TO HEAT"). As in this case, different measures may be taken for the same issue on the same component depending on the product.

The link to details is a number indicating a link to detailed information on the measure, including details of the issue relating to the measure, the reason why the measure is applied, and notes on the measure. Although illustration is omitted from the drawings used herein, a detailed information table is defined in the issue/measure DB 34. In the detailed information table, numbers of the links to details and detailed information on the measures are associated with each other. For example, in the detailed information table, a number "LINK 01" of the link to details associated with the measure ID "S01" is associated with detailed information indicating that the ambient temperature has become a certain degree and therefore a fan having a corresponding size may be necessary.

The urgency level serving as an urgency index is a value indicating urgency of the measure. For example, if a product recall has occurred, the measure to be taken for the recall has a high urgency. That is, this measure needs to be applied earlier than any other products. In this exemplary embodiment, three levels of "A" (high urgency), "B" (low urgency), and "C" (normal condition) are provided as the urgency levels but the urgency level may be represented by other indices.

The date of creation is a date when the record is registered.

Although details are described later, among the pieces of information registered in the measure table, the details of the measure, the removal target component number, the addition target component number, the applied product, the link to details, and the urgency level are registered based on an input from the design engineer who is involved in designing by using the 3D CAD. The detailed information on the measure in the detailed information table is also registered based on an input from the design engineer.

Referring back to FIG. 2, the storage unit 32 further stores a priority index DB 36. The priority index DB 36 stores the components registered in the issue/measure DB 34 and priority indices of the components in association with each other. The priority index is an index to be used for calculating a priority evaluation value indicating a priority of each measure registered in the issue/measure DB 34. Alternatively, the priority index itself may be used as an indicator of the priority of each measure. Thus, the storage unit 32 also functions as a priority index memory.

FIG. 4 illustrates an example of details of the priority index DB 36. The priority index DB 36 stores the component numbers, prices, the numbers of shipped maintenance components, cumulative totals of shipments, and maintenance factors in association with each other. In this exemplary embodiment, the priority index DB 36 stores plural priority indices. Specifically, the priority index DB 36 stores the price as a first priority index and the maintenance factor as a second priority index.

The component number is a number of the component registered in the issue/measure DB 34.

The price, the number of shipped maintenance components, and the cumulative total of shipments are pieces of information on the component. For example, the design assistance tool providing server 12 may have those pieces of information. When the component is registered in the priority index DB 36, the component information management server 14 requests pieces of information on the component from the design assistance tool providing server 12 to acquire those pieces of information and store the pieces of information in the priority index DB 36.

The maintenance factor is a value calculated by (number of shipped maintenance components/cumulative total of shipments)×100. The number of shipped maintenance components is the number of components shipped for maintenance (such as replacement). Therefore, as the maintenance factor decreases, the possibility of maintenance of the component decreases. That is, the component is less prone to damage and has a high reliability.

Referring back to FIG. 2, a controller 38 is configured by, for example, a CPU and controls the respective units of the component information management server 14 in accordance with the program stored in the storage unit 32. As illustrated in FIG. 2, the controller 38 also functions as the component information registering unit 40, a component information reading unit 42, and a priority evaluation value calculating unit 44.

The component information registering unit 40 registers component information in the issue/measure DB 34 based on an input from the design terminal 16 (design engineer).

Specifically, the component information registering unit 40 registers the component number, the details of the issue, and the measure ID in the issue table and the details of the measure, the removal target component number, the addition target component number, the applied product, the link to details, and the urgency level in the measure table. The component information registering unit 40 also registers the detailed information on each measure in the detailed information table.

When the component registered in the issue/measure DB 34 is displayed on a display screen of the 3D CAD while the design engineer is involved in designing by using the 3D CAD on the design terminal 16, the component information reading unit 42 reads the component information relating to the component from the issue/measure DB 34. Specifically, the component information reading unit 42 reads the details of the issue and the measure ID from the issue table by setting the component number of the displayed component as a key and also reads the details of the measure, the removal target component number, the addition target component number, the applied product, and the urgency level from the measure table by setting the read measure ID as a key. The component information reading unit 42 also reads the detailed information on the measure from the detailed information table in response to a request from the design engineer while the measure is specified.

The priority evaluation value calculating unit 44 calculates a priority evaluation value of each measure registered in the issue/measure DB 34 based on the removal target component number and the addition target component number registered in the measure table of the issue/measure DB 34 and the priority index relating to each component stored in the priority index DB 36.

First, a method for calculating the priority evaluation value by using the price is described. When the price is used as the priority index, the priority evaluation value calculating unit 44 calculates the priority evaluation value of each measure based on a difference between the sum of the prices of the addition target components and the sum of the prices of the removal target components. For example, in the case of the measure ID "S01", there is no removal target component and therefore the price of the addition target component "ZZ888A" is directly set as the priority evaluation value. That is, the priority evaluation value is "+3". In a case of a measure ID "S03", the priority evaluation value is "−3", which is a value obtained by subtracting "10" that is the price of the removal target component "AB012C" from "7" that is the sum of the prices of addition target components "CD333A", "EF543B", and "GH555A".

In this manner, the priority evaluation value calculating unit 44 calculates the priority evaluation value of each measure. The priority evaluation value of the measure ID "S01" is "+3". The priority evaluation value of the measure ID "S02" is "−1". The priority evaluation value of the measure ID "S03" is "−3". The priority evaluation value of a measure ID "S04" is "−7".

The priority evaluation values calculated as described above mean that the cost is reduced more by taking the measure as the value decreases. Therefore, from the viewpoint of cost, the priority of the measure increases as the priority evaluation value decreases.

Next, a method for calculating the priority evaluation value by using the maintenance factor is described. Similarly when the maintenance factor is used as the priority index, the priority evaluation value calculating unit 44 calculates the priority evaluation value of each measure based on a difference between the sum of the maintenance factors of the addition target components and the sum of the maintenance factors of the removal target components. For example, in the case of the measure ID "S01", there is no removal target component and therefore the maintenance factor of the addition target component "ZZ888A" is directly set as the priority evaluation value. That is, the priority evaluation value is "+0.0024%". In the case of the measure ID "S03", the priority evaluation value is "+2.215%", which is a value obtained by subtracting "0.82%" that is the maintenance factor of the removal target component "AB012C" from "3.035%" that is the sum of the maintenance factors of the addition target components "CD333A", "EF543B", and "GH555A".

In this manner, the priority evaluation value calculating unit 44 calculates the priority evaluation value of each measure. The priority evaluation value of the measure ID "S01" is "+0.0024%". The priority evaluation value of the measure ID "S02" is "+11.66%". The priority evaluation value of the measure ID "S03" is "+2.215%". The priority evaluation value of the measure ID "S04" is "+10.53%".

The priority evaluation values calculated as described above mean that the maintenance factor is reduced more by taking the measure as the value decreases. Therefore, from the viewpoint of maintainability, the priority of the measure increases as the priority evaluation value decreases.

The priority evaluation value calculating unit 44 may set the priority index relating to each component stored in the priority index DB 36 directly as the priority evaluation value of each measure. For example, when all of the plural measures are addition of a single component, the price or the maintenance factor of the component to be added by each measure is set directly as the priority evaluation value of each measure.

Figure 5:
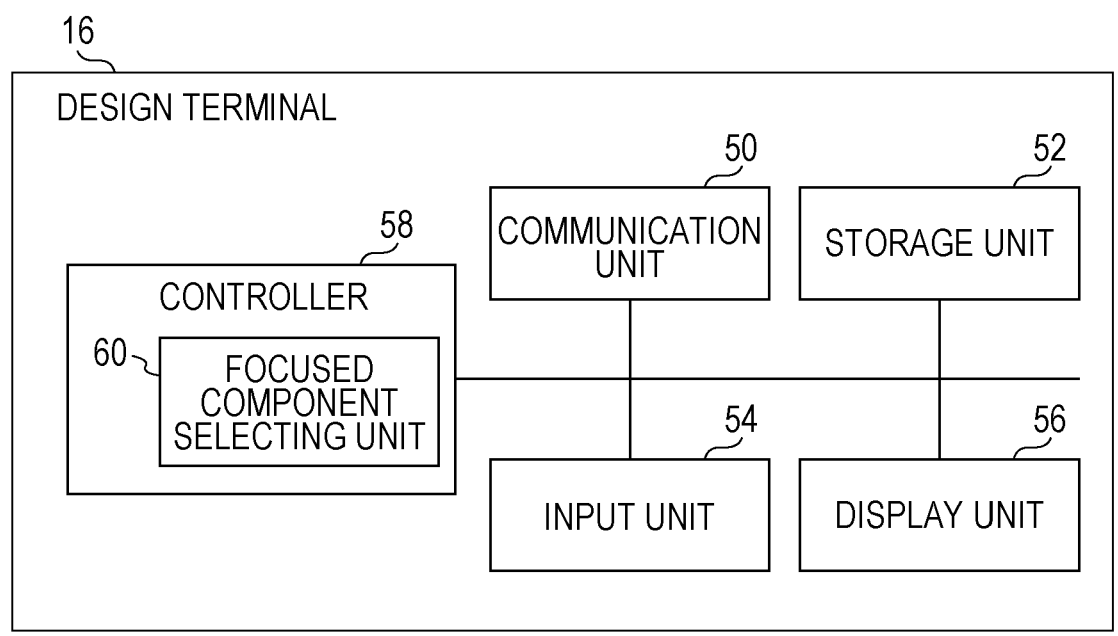
FIG. 5 is a schematic diagram illustrating the configuration of a design terminal according to the exemplary embodiment.

FIG. 5 is a schematic diagram illustrating the configuration of the design terminal 16. The design terminal 16 is, for example, a general personal computer.

A communication unit 50 is configured by, for example, a network adapter and exerts a function of communicating with the design assistance tool providing server 12 and the component information management server 14 via the communication network 18.

A storage unit 52 includes, for example, a hard disk drive, a ROM, or a RAM. The storage unit 52 stores a program for operating respective units of the design terminal 16.

An input unit 54 includes, for example, a mouse or a keyboard and is used for inputting commands from the design engineer for the design terminal 16.

A display unit 56 is configured by, for example, a liquid crystal panel and displays various screens including the display screen of the 3D CAD.

A controller 58 is configured by, for example, a CPU and controls the respective units of the design terminal 16 in accordance with the program stored in the storage unit 52. For example, the controller 58 controls the display unit 56 to display the display screen of the 3D CAD based on information received from the design assistance tool providing server 12 and the component information management server 14. As illustrated in FIG. 5, the controller 58 exerts a function as a focused component selecting unit 60.

The focused component selecting unit 60 selects a focused component from among the components displayed on the display screen of the 3D CAD that is displayed on the display unit 56. The focused component is such a component that the issue on the component and the measure to address the issue are displayed on the display screen of the 3D CAD.

As the focused component, the focused component selecting unit 60 automatically selects a component on which the design engineer focuses attention presumably. When the design engineer focuses attention on a certain component, the design engineer tends to display the component on the 3D CAD under magnification. In view of this tendency, the focused component selecting unit 60 of this exemplary embodiment selects, as the focused component, a component whose display area (number of display pixels) on the display screen of the 3D CAD has become equal to or larger than a predetermined value.

The focused component selecting unit 60 may change the predetermined area in accordance with the size of the component. Since the size differs from one component to another, an extremely small component may be difficult to select as the focused component when a component having an area equal to or larger than the predetermined area that is set uniformly is selected as the focused component. Therefore, the predetermined area may be set smaller for a smaller component and larger for a larger component. When the area of each component has become equal to or larger than the corresponding predetermined area, the focused component selecting unit 60 may select the component as the focused component.

The focused component selecting unit 60 may select the focused component based on the position of the component on the display screen of the 3D CAD. For example, the design engineer may tend to display the focused component near a central position on the display screen of the 3D CAD. Therefore, the focused component selecting unit 60 may select, as the focused component, the component near the central position on the display screen. The focused component selecting unit 60 may select the focused component in consideration of both of the display area and the display position of the component. For example, the focused component selecting unit 60 may select the focused component based on the display area while assigning a greater weight to the area of the component located closer to the center of the display screen.

Alternatively, the focused component selecting unit 60 may select the focused component based on a manual instruction from the design engineer.

Details of the method for inputting the issue on the component and the measure to address the issue on the design terminal 16 are described below with reference to FIG. 6A to FIG. 7B.

Figure 6A:
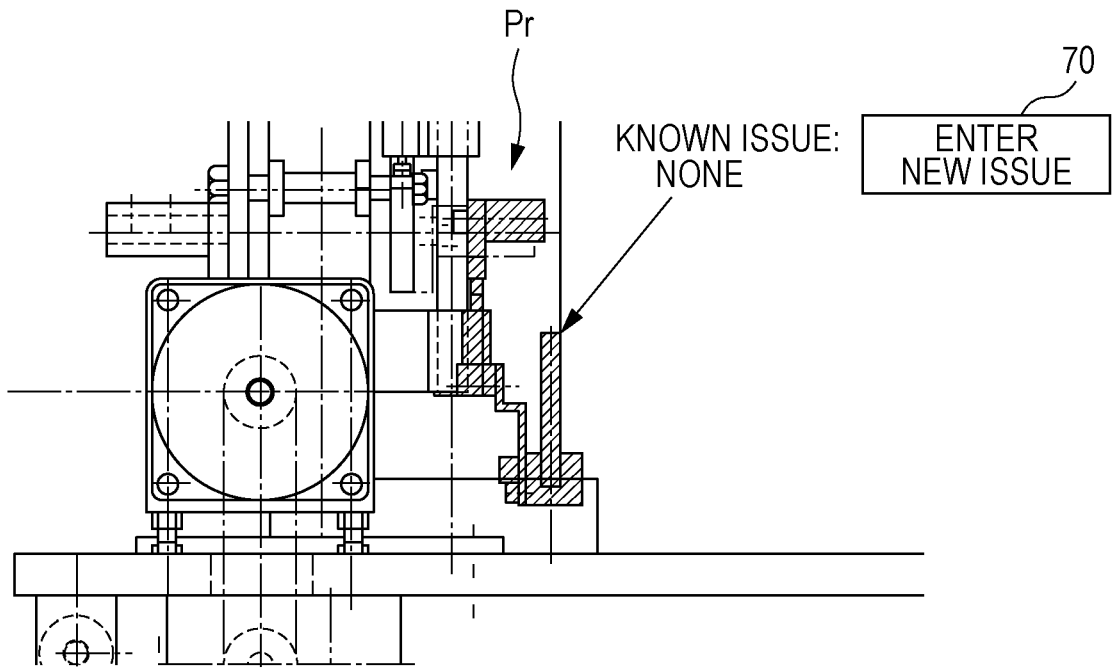
FIGS. 6A and 6B illustrate display examples of a screen of the design terminal when an issue on a component is input.

FIG. 6A illustrates a part of the display screen of the 3D CAD that is displayed on the display unit 56 when a design engineer A is involved in designing by using the 3D CAD on the design terminal 16. In FIG. 6A, the component colored black is a focused component Pr selected by the focused component selecting unit 60. It is assumed that an issue on the focused component Pr and a measure to address the issue have not been registered in the issue/measure DB 34 yet. In this case, as illustrated in FIG. 6A, the display screen of the 3D CAD shows that there is no known issue on the focused component Pr. In addition, a new issue input button 70 is displayed on the display screen of the 3D CAD so as to allow the design engineer A to input a new issue on the focused component Pr.

Figure 6B:
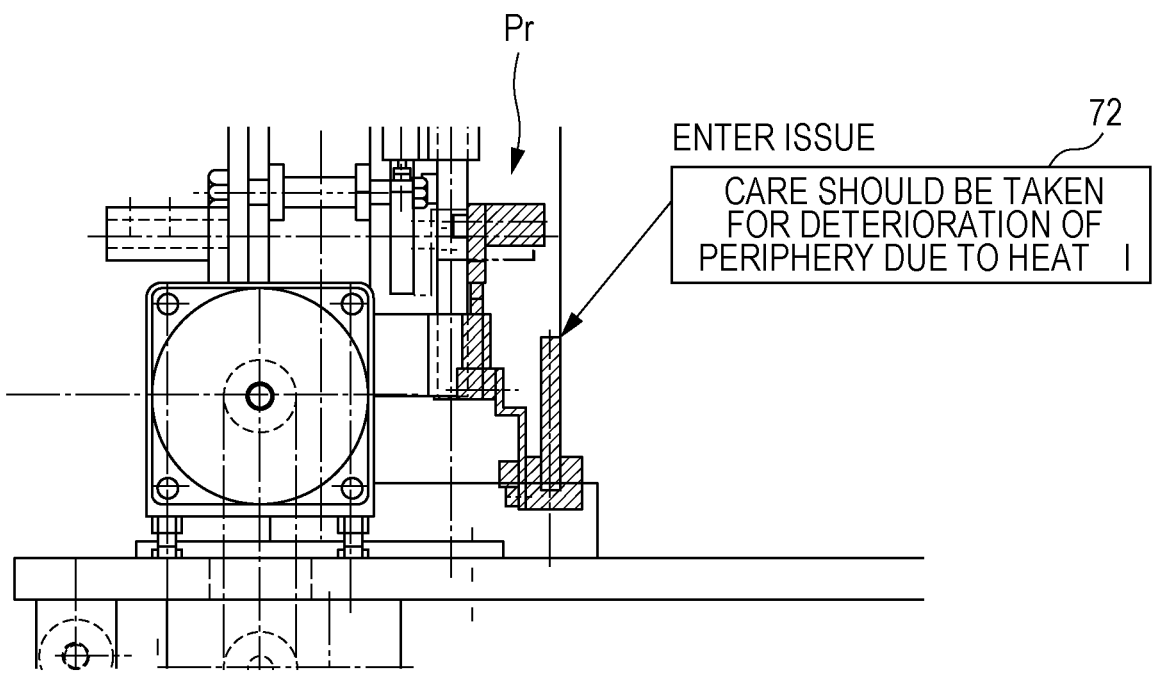

When the design engineer A has clicked the new issue input button 70, as illustrated in FIG. 6B, an issue input field 72 is displayed so as to input details of the issue on the focused component Pr. The design engineer A inputs text of the details of the issue on the focused component Pr in the issue input field 72.

When the design engineer A has input the details of the issue in the issue input field 72 (or has clicked an "OK" button or the like that is displayed separately after the input), the component number of the focused component Pr and the details of the issue that are input in the issue input field 72 are transmitted to the component information management server 14. The component information registering unit 40 of the component information management server 14 registers the component number and the details of the issue that have been received from the design terminal 16 in the issue table of the issue/measure DB 34 in association with each other.

Figure 7A:
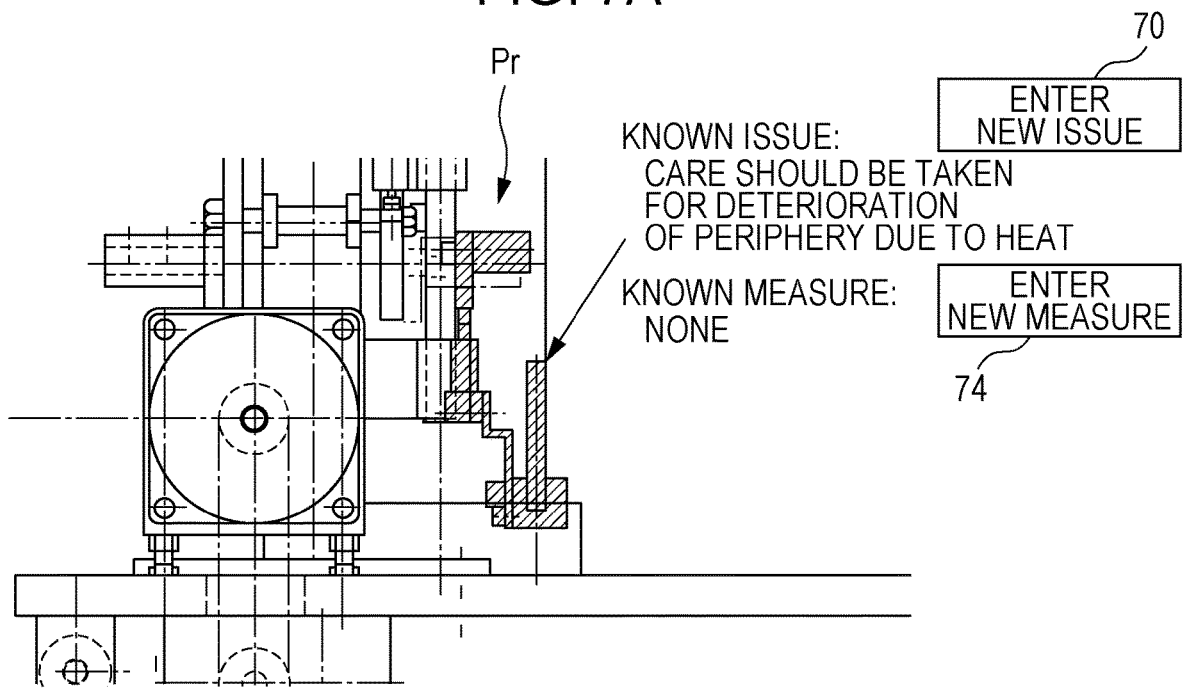
FIGS. 7A and 7B illustrate display examples of the screen of the design terminal when a measure to address the issue on the component is input.

FIG. 7A illustrates a part of the display screen of the 3D CAD after the design engineer A has input the issue on the focused component Pr. When the issue on the focused component Pr has been input, the input issue is displayed as the known issue. The new issue input button 70 may be displayed continuously. Thus, the design engineer A may also input other issues on the focused component Pr.

The measure to address the issue on the focused component Pr has not been registered in the issue/measure DB 34 yet. Therefore, as illustrated in FIG. 7A, the display screen of the 3D CAD shows that there is no known measure to address the known issue on the focused component Pr. In addition, a new measure input button 74 is displayed on the display screen of the 3D CAD so as to allow the design engineer A to input a new measure to address the issue on the focused component Pr.

Figure 7B:
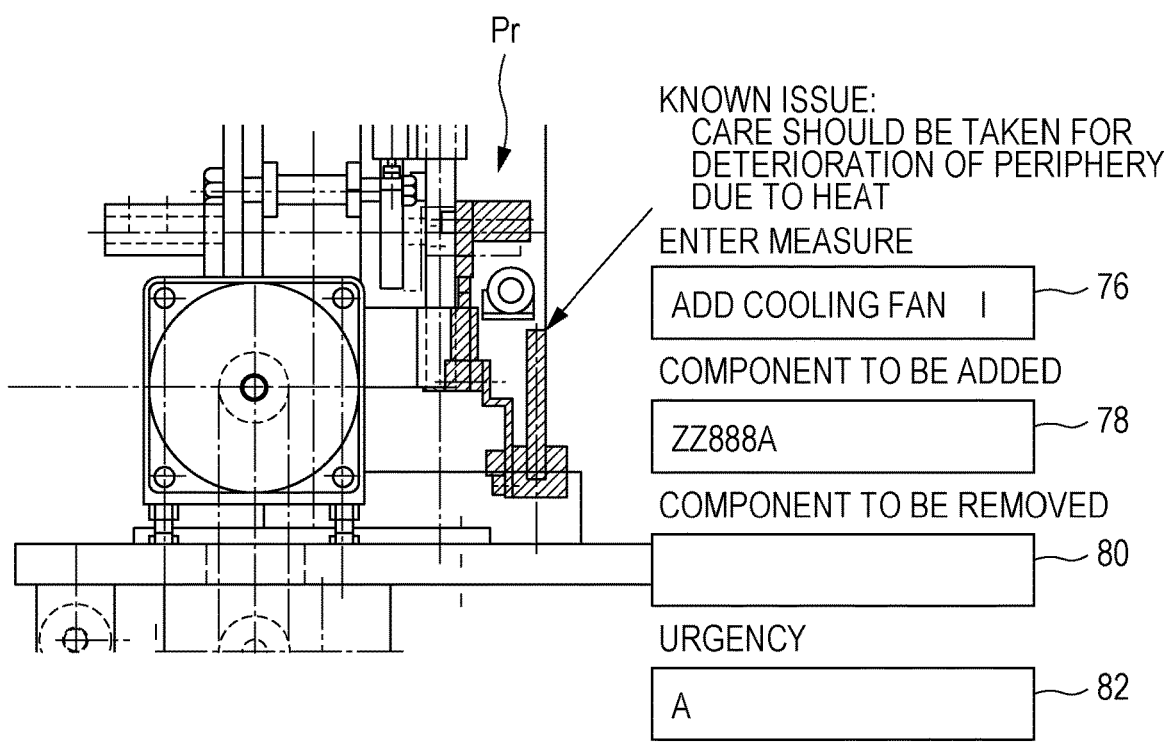

When the design engineer A has clicked the new measure input button 74, as illustrated in FIG. 7B, a measure input field 76 is displayed so as to input details of the measure to address the issue on the focused component Pr. An addition target component input field 78 is displayed so as to input a component number of an addition target component to be added by taking the measure. A removal target component input field 80 is displayed so as to input a component number of a removal target component to be removed by taking the measure. An urgency input field 82 is displayed so as to input urgency of the measure. The design engineer A inputs text of the details of the measure to address the issue on the focused component Pr in the measure input field 76, the component number in at least one of the addition target component input field 78 and the removal target component input field 80, and the urgency in the urgency input field 82. Although illustration is omitted from FIG. 7B, a detailed information input field may be displayed so as to input detailed information on the measure and the design engineer A may input the detailed information on the measure in the detailed information input field.

When the design engineer A has completed the input of the items relating to the measure (or has clicked an "OK" button or the like that is displayed separately after the input), the component number of the focused component Pr, the details of the issue, the details of the measure, the component number of at least one of the addition target component and the removal target component, a number of a product to which the measure is applied (may be extracted from the data on the 3D CAD), and the urgency level are transmitted to the component information management server 14. The component information registering unit 40 of the component information management server 14 registers a measure ID in the record of the issue table including the component number and the details of the issue that have been received from the design terminal 16 and also registers the measure ID and the details of the measure, at least one of the addition target component and the removal target component, the number of the applied product, and the urgency level that have been received in the measure table in association with each other. When the detailed information on the measure is input, the component information registering unit 40 registers a number of a link to details in the record of the measure table and stores the registered number of the link to details and the received detailed information in the detailed information table in association with each other.

In the manner described above, the issue on the component of the product designed by each design engineer and the measure to address the issue are accumulated in the issue/measure DB 34 by the plural design engineers who are involved in designing by using the design assistance system 10.

Figure 8:
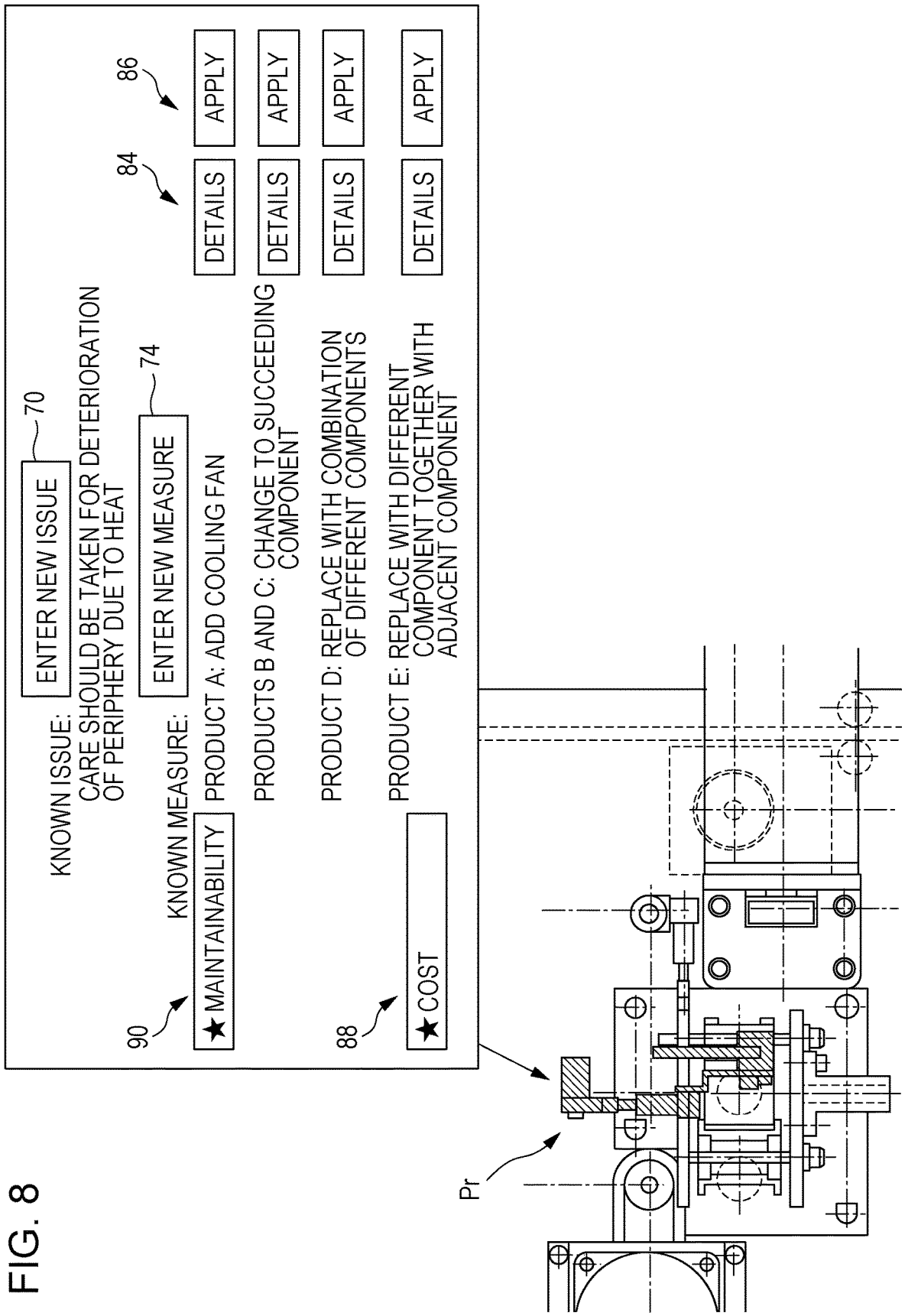
FIG. 8 illustrates an example in which plural measures to address an issue on a focused component are displayed in such a format that priorities are understandable.

FIG. 8 illustrates a part of the display screen of the 3D CAD that is displayed on the display unit 56 when a design engineer B who designs a product different from that of the design engineer A is involved in designing by using the 3D CAD on the design terminal 16. FIG. 8 illustrates an example of a display screen when the contents illustrated in FIGS. 3A and 3B are registered in the issue/measure DB 34 and the component "AB012C" (component colored black in FIG. 8) is selected as the focused component Pr.

When the component "AB012C" is selected as the focused component Pr in response to an operation performed by the design engineer B on the 3D CAD, the component number of the focused component Pr is transmitted from the design terminal 16 to the component information management server 14. The component information reading unit 42 searches the issue table of the issue/measure DB 34 by setting the received component number as a key and reads the details of the issue and the plural measure IDs associated with the component number "AB012C" from the issue/measure DB 34.

Subsequently, the component information reading unit 42 searches the measure table by setting the measure IDs read from the issue table as keys and reads the details of the measures, the removal target component numbers, the addition target component numbers, and the applied products associated with the respective measure IDs from the measure table of the issue/measure DB 34. The details of the issue, the measure IDs, the details of the measures, and the applied products that have been read are transmitted to the design terminal 16 that is used by the design engineer B. It is suitable that the component information reading unit 42 read the urgency levels associated with the respective measures from the measure table and transmit the urgency levels to the design terminal 16.

The priority evaluation value calculating unit 44 calculates the priority evaluation values of the respective measures by the method described above based on the priority index DB 36 and the removal target component numbers and the addition target component numbers of the respective measures that have been read by the component information reading unit 42. The priority evaluation values of the respective measures that have been calculated by the priority evaluation value calculating unit 44 are transmitted to the design terminal 16 that is used by the design engineer B.

Various types of information received from the component information management server 14 are displayed on the display unit 56 (specifically, the display screen of the 3D CAD) of the design terminal 16 that is used by the design engineer B. Specifically, the issue on the focused component Pr and the plural measures to address the issue that have been registered in the issue/measure DB 34 are displayed as illustrated in FIG. 8. That is, plural measures are displayed for one issue. It is suitable that the issue and the plural measures be displayed in a format associated with the focused component Pr. Thus, the display unit 56 also functions as a measure display. Also in this case, the new issue input button 70 may be displayed so as to allow the design engineer B to input a new issue on the focused component Pr. Further, the new measure input button 74 may be displayed so as to allow the design engineer B to input a new measure to address the known issue.

Each measure is displayed in such a format that the product to which the measure is applied is identified clearly. For example, in the example of FIG. 8, the display is made in a format of "PRODUCT A: ADD COOLING FAN". A "DETAILS" button 84 and an "APPLY" button 86 are displayed in association with each measure.

When the design engineer B has clicked the "DETAILS" button 84, a detailed information request is transmitted to the component information management server 14 together with the measure ID of the measure corresponding to the clicked "DETAILS" button 84. When the detailed information request has been received, the component information reading unit 42 reads, from the detailed information table, the detailed information corresponding to the number of the link associated with the measure ID received together and transmits the detailed information to the design terminal 16 that is used by the design engineer B. Then, the received detailed information is displayed on the display screen of the 3D CAD of the design terminal 16.

When the design engineer B has clicked the "APPLY" button 86, the measure corresponding to the clicked "APPLY" button 86 may be applied to the product designed by the design engineer B.

The plural measures for one issue on the focused component Pr are displayed in a format based on the priority evaluation values calculated by the priority evaluation value calculating unit 44 of the component information management server 14. In this exemplary embodiment, the priority evaluation values are calculated by using the two priority indices that are the price and the maintenance factor. Therefore, the plural measures are displayed in a format based on the priority evaluation values calculated by using the price and in a format based on the priority evaluation values calculated by using the maintenance factor. In this exemplary embodiment, a measure having the lowest priority evaluation value calculated based on the price and a measure having the lowest priority evaluation value calculated based on the maintenance factor are displayed.

Specifically, as illustrated in FIG. 8, a cost mark 88 is displayed for the measure "PRODUCT E: REPLACE WITH DIFFERENT COMPONENT TOGETHER WITH ADJACENT COMPONENT" to indicate that this measure has the lowest priority evaluation value calculated by using the price among the plural measures. A maintainability mark 90 is displayed for the measure "PRODUCT A: ADD COOLING FAN" to indicate that this measure has the lowest priority evaluation value calculated by using the maintenance factor among the plural measures.

The plural measures may be displayed by a method other than the method described above as long as the measures are displayed in the format based on the priority evaluation values. For example, the plural measures may be displayed while being sorted in the order of the priority evaluation values calculated by using the price and in the order of the priority evaluation values calculated by using the maintenance factor. In this case, the design engineer may be allowed to switch the display between the two sorting orders based on the priority evaluation values or the plural measures sorted in the orders of the two types of priority evaluation value may be displayed in parallel.

It is suitable that the plural measures may be displayed in a format based on their urgency levels received from the component information management server 14. For example, the urgency levels of the respective measures may be displayed in a format associated with the measures in addition to the display contents illustrated in FIG. 8. Alternatively, a mark may be displayed for a measure having a high urgency level (for example, "urgency level A") alone to indicate that the urgency is high.

As described above, in the design assistance system 10 according to this exemplary embodiment, the component information management server 14 stores an issue on a component and plural measures to address the issue. When a focused component is selected from among components displayed on the 3D CAD and is registered in the component information management server 14, an issue and plural measures associated with the focused component are transmitted from the component information management server 14 and are displayed on the display screen of the 3D CAD. At this time, the plural measures are displayed in a format based on a priority index (in this exemplary embodiment, the price or the maintenance factor).

A flow of processing performed in the design assistance system 10 is described below with reference to a flowchart illustrated in FIG. 9. At the start of the flowchart of FIG. 9, it is assumed that an issue on a component and plural measures to address the issue are stored in the issue/measure DB 34 in association with each other and priority indices relating to addition target components and removal target components in the respective measures are stored in the priority index DB 36.

In Step S10, the focused component selecting unit 60 of the design terminal 16 selects a focused component from among plural components displayed on the display screen of the 3D CAD. A component number of the selected focused component is transmitted to the component information management server 14.

In Step S12, the component information reading unit 42 reads details of an issue and plural measure IDs from the issue table of the issue/measure DB 34 based on the received component number.

In Step S14, the component information reading unit 42 reads details of measures, removal target component numbers, addition target component numbers, and applied products relating to the plural measures from the measure table based on the plural measure IDs read in Step S12.

In Step S16, the priority evaluation value calculating unit 44 calculates priority evaluation values of the respective measures from the viewpoint of cost based on the removal target component numbers and the addition target component numbers in the respective measures read in Step S14 and the prices of the components stored in the priority index DB 36.

In Step S18, the priority evaluation value calculating unit 44 calculates priority evaluation values of the respective measures from the viewpoint of maintainability based on the removal target component numbers and the addition target component numbers in the respective measures read in Step S14 and the maintenance factors of the components stored in the priority index DB 36.

The issue on the focused component that has been read in Step S12, the measures to address the issue and the applied products that have been read in Step S14, and the priority evaluation values of the respective measures from the viewpoint of cost and maintainability that have been calculated in Steps S16 and S18 are transmitted from the component information management server 14 to the design terminal 16.

In Step S20, the display unit 56 of the design terminal 16 displays the issue on the focused component. In addition, the display unit 56 displays the plural measures in a format based on the priority evaluation values from the viewpoint of cost and in a format based on the priority evaluation values from the viewpoint of maintainability.

Although the exemplary embodiment of the present invention is described above, the exemplary embodiment of the present invention is not limited to the exemplary embodiment described above and various modifications may be adopted.

For example, this exemplary embodiment provides the configuration in which an issue and plural measures to address the issue are accumulated in the issue/measure DB 34 based on inputs from plural design engineers. The method for storing the issue and the plural measures is not limited thereto.

In this exemplary embodiment, the design assistance tool providing server 12 provides the 3D CAD. The design assistance tool to be used by the design engineer may be installed in the design terminal 16.

This exemplary embodiment provides the server-client system including the component information management server 14 that accumulates issues and measures and calculates priority evaluation values, and the design terminal 16 that displays an issue and plural measures associated with a focused component on the display screen of the 3D CAD. The exemplary embodiment of the present invention is also applicable to a single design assistance apparatus. In this case, the design assistance apparatus has the functions of the issue/measure DB 34, the priority index DB 36, the component information registering unit 40, the component information reading unit 42, the priority evaluation value calculating unit 44, and the respective units of the design terminal 16. A storage unit of the design assistance apparatus stores a design assistance program for operating the respective units of the design assistance apparatus. The design assistance apparatus exerts the functions described above based on the design assistance program.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A design assistance system, comprising:
   a component information management server comprising:
   an issue/measure information memory that stores a component to be used in a design assistance tool, an issue on the component, and a plurality of measures to address the issue, wherein the component, the issue and the plurality of measures are stored in association with each other, each of the plurality of measures including at least one of addition of at least one addition target component and removal of at least one removal target component; and
   a priority index memory that stores a priority index in association with the addition target component and the removal target component, wherein a priority evaluation value for each of the plurality of measures is calculated based on a difference between the sum of the priority index of the at least one addition target component or zero if no addition target component is included and the sum of the priority index of the at least one removal target component or zero if no removal target component is included; and
   a design terminal comprising a measure display that displays, while designing is conducted by using the design assistance tool, a plurality of measures to address an issue on a focused component in a format, on a screen, based on the priority index associated with at least one of the addition target component and the removal target component included in each of the measures, wherein the plurality of measures are displayed on the screen concurrent with the focused component, the plurality of measures being displayed in a box with an pointer pointing to the focused component, at least one of the plurality of measures provided with a first indicator representing a top ranking for a first criterion used to calculate the priority index.

2. The design assistance system according to claim 1,
   wherein the component information management server calculates priority evaluation values based on the priority index associated with at least one of the addition target component and the removal target component included in each of the plurality of measures to address the issue on the focused component, and
   wherein the measure display displays the plurality of measures in a format based on the priority evaluation values associated with the respective measures.

3. The design assistance system according to claim 1,
   wherein the priority index memory stores a first priority index and a second priority index in association with the addition target component and the removal target component, and
   wherein the measure display displays the plurality of measures to address the issue on the focused component in a format based on the first priority index associated with at least one of the addition target component and the removal target component included in each of the measures and in a format based on the second priority index associated with at least one of the addition target component and the removal target component included in each of the measures.

4. The design assistance system according to claim 1,
   wherein the issue/measure information memory stores an urgency index indicating urgency in association with each of the plurality of measures, and
   wherein the measure display displays the plurality of measures in a format based on the priority index and the urgency index of each of the measures.

5. A design assistance apparatus, comprising:
   an issue/measure information memory that stores a component to be used in a design assistance tool, an issue on the component, and a plurality of measures to address the issue, wherein the component, the issue and the plurality of measures are stored in association with each other, each of the plurality of measures including at least one of addition of at least one addition target component and removal of at least one removal target component;
   a priority index memory that stores a priority index in association with the addition target component and the removal target component, wherein a priority evaluation value for each of the plurality of measures is calculated based on a difference between the sum of the priority index of the at least one addition target component or zero if no addition target component is included and the sum of the priority index of the at least one removal target component or zero if no removal target component is included; and a measure display that displays, while designing is conducted by using the design assistance tool, a plurality of measures to address an issue on a focused component in a format, on a screen, based on the priority index associated with at least one of the addition target component and the removal target component included in each of the measures wherein the plurality of measures are displayed on the screen concurrent with the focused component, the plurality of measures being displayed in a box with an pointer pointing to the focused component, at least one of the plurality of measures provided with a first indicator representing a top ranking for a first criterion used to calculate the priority index.

6. A non-transitory computer readable medium storing a design assistance program causing a computer to execute a process comprising:

storing a component to be used in a design assistance tool, an issue on the component, and a plurality of measures to address the issue, wherein the component, the issue and the plurality of measures are stored in association with each other, each of the plurality of measures including at least one of addition of at least one addition target component and removal of at least one removal target component;

storing a priority index in association with the addition target component and the removal target component, wherein a priority evaluation value for each of the plurality of measures is calculated based on a difference between the sum of the priority index of the at least one addition target component or zero if no addition target component is included and the sum of the priority index of the at least one removal target component or zero if no removal target component is included; and displaying, while designing is conducted by using the design assistance tool, a plurality of measures to address an issue on a focused component in a format, on a screen, based on the priority index associated with at least one of the addition target component and the removal target component included in each of the measures, wherein the plurality of measures are displayed on the screen concurrent with the focused component, the plurality of measures being displayed in a box with an pointer pointing to the focused component, at least one of the plurality of measures provided with a first indicator representing a top ranking for a first criterion used to calculate the priority index.

7. A design assistance system, comprising:

a component information management server comprising:
issue/measure information storage means for storing a component to be used in a design assistance tool, an issue on the component, and a plurality of measures to address the issue, wherein the component, the issue and the plurality of measures are stored in association with each other, each of the plurality of measures including at least one of addition of at least one addition target component and removal of at least one removal target component; and priority index storage means for storing a priority index in association with the addition target component and the removal target component, wherein a priority evaluation value for each of the plurality of measures is calculated based on a difference between the sum of the priority index of the at least one addition target component or zero if no addition target component is included and the sum of the priority index of the at least one removal target component or zero if no removal target component is included; and a design terminal comprising a measure display means for displaying, while designing is conducted by using the design assistance tool, a plurality of measures to address an issue on a focused component in a format, on a screen, based on the priority index associated with at least one of the addition target component and the removal target component included in each of the measures, wherein the plurality of measures are displayed on the screen concurrent with the focused component, the plurality of measures being displayed in a box with an pointer pointing to the focused component, at least one of the plurality of measures provided with a first indicator representing a top ranking for a first criterion used to calculate the priority index.

8. The design assistance system according to claim 1, wherein at least one other of the plurality of measures is provided with a second indicator representing a top ranking for a second criterion used to calculate the priority index.

9. The design assistance system according to claim 8, wherein the first criterion is a cost criterion and the second criterion is a maintainability criterion.

* * * * *